Feb. 3, 1953 — R. L. BEASON — 2,627,404
AUXILIARY SPRING STRUCTURE
Filed Jan. 17, 1951
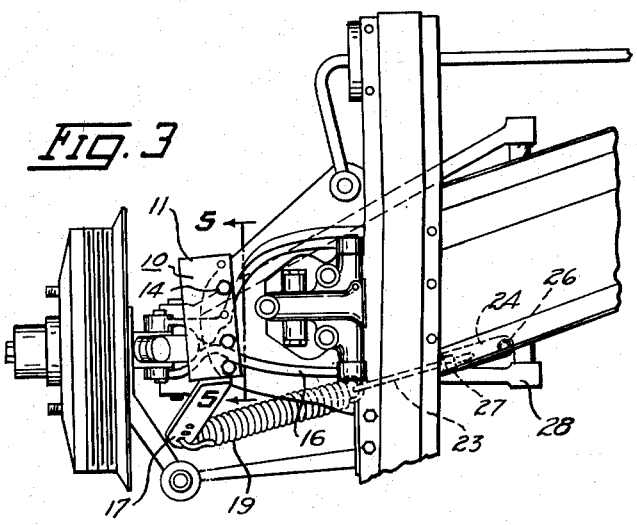
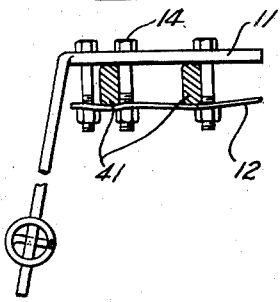
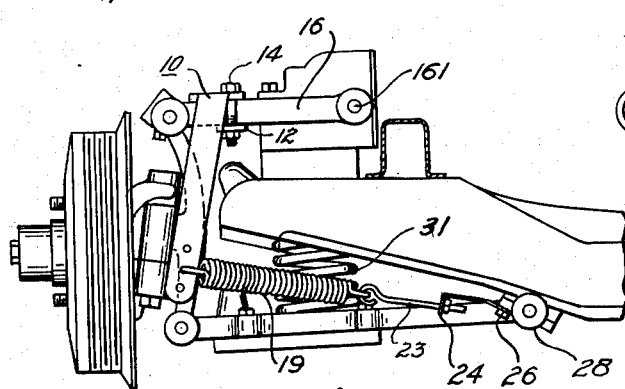
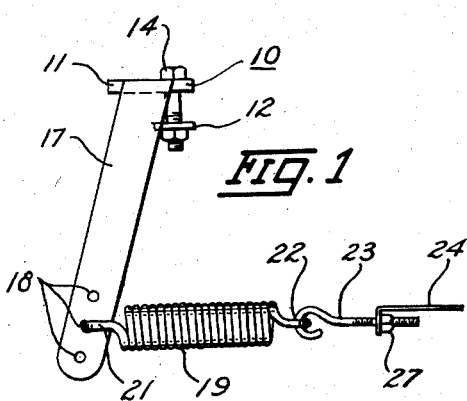
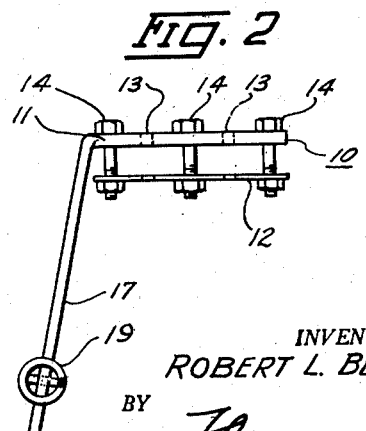
INVENTOR.
ROBERT L. BEASON
BY
Flournoy Corey
ATTORNEY.

Patented Feb. 3, 1953

2,627,404

UNITED STATES PATENT OFFICE 2,627,404

AUXILIARY SPRING STRUCTURE

Robert L. Beason, Cedar Rapids, Iowa, assignor to New Method Equipment Company, Indianola, Iowa, a corporation of Iowa Application January 17, 1951, Serial No. 206,456

2 Claims. (Cl. 267—20)

This invention relates to auxiliary springs for motor vehicles and has particular relation to means for supplementing the coil springs of so-called knee action spring suspension for automotive vehicles.

In recent years it has become more and more conventional construction to mount the wheel spindles of motor vehicles on a pair of horizontally extending lever or control arms with the spindles mounted on a vertical post which is pivotally engaged at its upper and lower ends to the free arms of the horizontally extending control arms. The lower horizontally extending control arm is usually of greater length than the upper arm.

In use, when a load is applied to the motor vehicle or the wheels strike a bump, a coil spring which is disposed between the lower control arm and the frame of the vehicle is compressed. Inasmuch as the lower control arm is longer than the upper arm, a tilting action of the top of the spindle post inwardly toward the center line of the vehicle occurs, and this produces a spreading action of the wheels on the opposite sides.

Also, in going around a curve, the outer wheel is caused to tilt inwardly to afford better steering of the vehicle.

In use, however, these coil springs may lose some of their effectiveness and become weaker so as to cause the undesirable spreading of the wheels during straight, forward movement of the vehicle. At times, greater loads may be applied to the vehicle, as for instance when the vehicle is employed to carry its full capacity of passengers and with their luggage or other loads, and these loads too tend to compress the coil springs to a greater extent than is desirable for best steering and minimum tire wear. Many times, too, a vehicle will sag toward the driver's side because the driver's weight is always present when the vehicle is moving and the other seats may not be occupied.

It is one of the main objects of my invention to provide an auxiliary spring for so-called knee action spring suspension structures of the character described, which will supplement the coil springs and afford additional springing support so as to position the structure in its proper relation for best efficiency and minimum tire wear and abuse.

Another object of my invention is to provide an auxiliary spring structure which may be selectively applied to the vehicle to produce greater auxiliary spring action or less as desired, to compensate for unequal sagging of springs, and unequal loading of the vehicle.

Another object of my invention is to provide an auxiliary spring structure in which a relatively long lever arm is employed so that excessive spring stresses are avoided.

Still another object of my invention is to provide an auxiliary spring structure in which the length of the lever arm acting on the coil spring structure may be varied as desired.

Still another object of my invention is to provide a device which may be applied to the conventional knee action spring structure with a minimum of labor, difficulty, and expense.

Still another object of my invention is to provide a device of the above character which is substantially universal in that it may be applied to all or almost all of the knee action spring structures now known.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a front view of an auxiliary spring and lever mechanism for supplementing the coil springs of knee action devices and constructed according to one embodiment of my invention.

Figure 2 is a side view of the device shown in Figure 1.

Figure 3 is a top plan view of the knee action or coil spring support structure of the left front wheel of a motor vehicle, with a portion of the frame and the wheel hub and the knee action structure illustrated so as to illustrate how the preferred device may be applied to the vehicle.

Figure 4 is a fragmentary rear view of the structure shown in Figure 3, and

Figure 5 is a side view of a modified form of the device shown in Figures 1 and 2, in which the device is adapted to engage a bifurcated upper arm of the coil spring structure.

Referring now to the drawings:

The device here shown, which illustrates one embodiment of my invention, includes a clamp illustrated at 10, having a heavy rectangular shaped upper mounting plate member 11 and a lighter clamping plate or strap member 12. In this clamping structure I preferably provide some five openings in both the upper and lower plates so that the bolts 14, employed to clamp the clamping means to the upper arm 16 of the coil spring structure, may be placed selectively in several different sets of openings so that the clamps may be engaged on many different forms of upper arm structures, such as illustrated at 16.

It is desirable that the bolts be as close together as possible, and in some cases the bolts 14 may be located in the inner holes 13, while in other cases they may be located in the outer holes, as illustrated in Figure 2. A downwardly and rearwardly and outwardly extending lever arm 17 is integral with or welded to the outermost end of the plate 11, and this lever arm is thus so positioned that it extends down in back of the knee action structure, preferably almost to the lower horizontal arm.

I preferably provide several openings in the lever arm 17, as illustrated at 18, so that the coil spring 19 may be engaged in any one of the openings as desired, to furnish greater or lesser pull or traction effort to the lever arm 17. The coil spring 19 should have on the order of 100 to 150 pounds initial tension, depending upon the weight of the vehicle, and the coil spring is preferably provided with opposed ears 21 and 22 so that one end of the spring may be engaged in one of the holes 18 and the other may be engaged by an eye bolt, such as illustrated at 23.

The inner end 22 of the coil spring and the eye bolt may be secured to the vehicle in any desired manner, but I have found that one of the best means of accomplishing this is by means of an L-shaped strap 24, the inner end of which is provided with an opening therethrough so that the bolt 26, which commonly holds the pivot shaft of the lower lever arm 28 in place, may be employed to secure the strap 24 to the frame of the vehicle.

It is apparent that the nut 27 may be drawn up to any desired position on the threaded shank of the eye bolt 23, and thus apply any desired initial tension to the spring 19.

If a load is applied to the motor vehicle, the upper arm 16 tends to move upwardly about the pivot point 161 and this causes the lower end of the lever arm 17 to move outwardly against the tension of the coil spring 19. Thus the coil spring 19 affords additional springing action supplementing the action of the knee action coil spring 31.

This supplementary springing action may be controlled by adjustment of the nut 27 on the shank of the eye bolt 23, and if greater than normal load is to be carried by the vehicle or if one side of the vehicle sags more than the other, the tension on the coil spring on that side of the vehicle may be accordingly increased as desired.

The clamping structure 10 may be applied to most of the vehicles employing the conventional knee action spring structure, by selectively placing the bolts 14 in any of the different holes 13. For instance, in Figure 5 I have illustrated the first two bolts so placed in the openings that they are on either side of one portion 41 of an upper control arm, such as 16, thus to prevent sliding or slippage of the clamping means on the control or A arm 16.

It should be noted that the clamping strap 12 should be of sufficient weight to stand the strain imposed upon it but preferably light enough to deform slightly when the clamping bolts are pulled up tight, to thus more closely engage the control arm and thereby prevent slipping and displacement.

Although I have described a specific embodiment of my invention, it is apparent that modifications thereof may be made by those skilled in the art. Such modifications may be made without departing from the spirit and scope of my invention as set forth in the appended claims.

I claim as my invention:

1. An auxiliary means for supplementing the supporting springs in knee action devices having pivotally mounted and generally horizontally extending upper and lower control arms, a substantially rigid mounting plate, means for clamping the mounting plate to an upper control arm, a lever arm extending downwardly from the mounting plate, and spring means biasing the lever arm inwardly about the pivot point of the upper control arm.

2. An auxiliary means for supplementing the supporting springs in knee action devices having pivotally mounted and generally horizontally extending upper and lower control arms, a substantially rigid mounting plate, deformable means and bolts for clamping the mounting plate to an upper control arm, a lever arm extending downwardly from the mounting plate, and spring means biasing the lever arm inwardly about the pivot point of the upper control arm.

ROBERT L. BEASON.

REFERENCES CITED

The following references are of record in the file of this patent:

UNITED STATES PATENTS

| Number | Name | Date |
| --- | --- | --- |
| 1,189,682 | Gingras | July 4, 1916 |
| 1,689,458 | Shears et al. | Oct. 30, 1928 |
| 2,117,533 | Armstrong | May 17, 1938 |
| 2,351,291 | Ross | June 13, 1944 |